(12) United States Patent
Lai et al.

(10) Patent No.: US 6,682,399 B1
(45) Date of Patent: Jan. 27, 2004

(54) PRESSURE MONITORING SYSTEM FOR CHEMICAL-MECHANICAL POLISHING

(75) Inventors: Chien-Hsin Lai, Kaohsiung; Jung-Nan Tseng, Chu-Pei; Huang-Yi Lin, Tai-Ping; Kevin Yu, Hsin-Chu, all of (TW)

(73) Assignee: United Microelectronics Corp., Hsin-Chu (TW)

( * ) Notice: Subject to any disclaimer, the term of this patent is extended or adjusted under 35 U.S.C. 154(b) by 367 days.

(21) Appl. No.: 09/715,656

(22) Filed: Nov. 17, 2000

(51) Int. Cl.[7] .............................................. B24B 49/00
(52) U.S. Cl. ........................................................ 451/8
(58) Field of Search ............................ 451/5, 8, 9, 41, 451/26, 53, 285, 286, 287, 288, 289, 388, 398

(56) References Cited

U.S. PATENT DOCUMENTS 6,113,480 A * 9/2000 Hu et al. ..................... 451/289
6,241,578 B1 * 6/2001 Togawa et al. ................. 451/5

* cited by examiner

Primary Examiner—Timothy V. Eley
Assistant Examiner—Dung Van Nguyen
(74) Attorney, Agent, or Firm—Powell Goldstein Frazer & Murphy LLP

(57) ABSTRACT

A pressure monitoring system arranged in a close loop circuit, intended to facilitate chemical mechanical polishing (CMP), is disclosed. The pressure monitoring circuit includes an air regulator, a pressure transducer, a pressure difference transducer and a pressure difference regulator. This hardware is equipped to facilitate finding three control parameters of the monitoring system—polishing pressure ($P_p$), pressure difference of the polishing pressure and a corresponding wafer pressure ($D_p$), and deviation of the output pressure difference from a set point pressure difference ($C_p$). By monitoring $P_p$, $D_p$ and $C_p$, air streams in a CMP process can be effectively regulated on a real time basis and the troubleshooting procedure for the system hardware can be practically reduced.

16 Claims, 5 Drawing Sheets

PRESSURE MONITORING SYSTEM FOR CHEMICAL-MECHANICAL POLISHING

BACKGROUND OF THE INVENTION

1. Field of the Invention

The present invention relates to a CMP (Chemical-Mechanical Polishing) pressure monitoring system. More particularly, the present invention relates to a close loop pressure monitoring system for regulating air streams used in operating chemical-mechanical polishing process on a real-time basis.

2. Description of the Prior Art

Recently, chemical-mechanical polishing (CMP) processes have become very well received in the planarization of a wafer surface in preparation for further device fabrication. The CMP process mainly involves holding a semiconductor wafer against a rotating polishing pad surface wetted by a polishing slurry, which typically comprises an acidic or basic etching solution in combination with alumina or silica particles. On one hand, the liquid portion of the slurry chemically removes, loosens, or modifies the composition of the material on the wafer which is to be removed. On the other hand, the particle portion of the slurry, in combination of the rotating polishing pad, physically removes the chemical modified material from the wafer. Thus, the name chemical-mechanical polishing was obtained.

A typical CMP set-up is demonstrated in FIG. 1A. Semiconductor wafer 10 is mounted with the surface to be polished exposed, on a wafer carrier 12 which is part of (or attached to) a polishing head 14. The mounted substrate is placed against rotating polishing pad 20 disposed on a base portion 22 of the polishing machine 24. In addition to the pad rotation, the carrier head 14 may rotate to provide additional motion between the substrate 10 and polishing pad 20 surface. The head and base portions of the polishing machine are generally equipped with pneumatic conveyor lines for supplying air forces (wafer air 30 and polish air 40 respectively) against the backsides of the substrate and polishing pad. The pressures of the air streams, designated as wafer air 30 and polish air 40 in the figure, are individually adjusted to secure the polishing surfaces in an appropriate contact. These air pressures contribute main sources of mechanical force during polishing operation and thus are an important factor that can affect the result of the CMP process.

Referring to FIG. 1B, the CMP structure is disclosed. One way used to control the air stream pressure values has been to put a pressure transducer 50 in each of the air flow lines to independently set the air pressures for each of the different air streams. A transducer 50 is incorporated with each regulator 52 to generate a feedback signal proportional to the pressure of the air in the outlet port of the air regulator. Necessary adjustments of the corresponding transducers 50 are made so as to maintain pressure values in each air flow line in a desired operating range. However, due to the operational delay characteristic towards the signal response, conventional pressure adjustments can only be made at idle. As a result, it is difficult to obtain the pressure control on a real time basis, especially during the continuous rotational movements of wafer polishing. Such occurrences certainly assert unstable pressure conditions of the polishing, and possibly cause the wafer to depart from the wafer head to cause wafer damages.

Besides the ineffectiveness of process control, another drawback with conventional pneumatic monitoring system is the lengthy troubleshooting procedure. Generally, the monitoring procedure is carried out separately for the wafer air 30 and polish air 40 from the signal readings shown on the individually equipped transducer which senses the output pressure of the corresponding regulator. Due to the independencies of the monitoring circuits, in many instances, however, it is difficult to detect individual hardware (especially the transducer) problem during the operation merely from the signalled pressures (hardware problems would cause incorrect signals and false readings). Such occurrences thus make the system control problematic. The pressure drifts sometimes become undetectable unless visible false operation has been shown (such as the wafer falling off the wafer head). False operation could cause polishing process to shutdown and is usually in need of a troubleshooting procedure to resume desirable operation. However, such troubleshooting could be quite time consuming for there may not be clear clues for finding the faulty component of the false operation. In such cases, all the suspected parts, that includes the ones in wafer side, in pad side and the polished wafer self, have to be checked to assure their applicability.

Therefore, there is a need for an effective pressure monitoring system capable of accurately regulating air streams in a CMP process on a real time basis and practically reducing such tedious troubleshooting procedure so as to optimize and improve the CMP process.

SUMMARY OF THE INVENTION

It is an object of the present invention to provide a pressure monitoring system which eliminates the problems of the prior art system.

It is a further object of the present invention to provide a pressure monitoring system whereby air pressures are monitored on a real time basis with a close loop arrangement.

Yet another object is to provide a pressure monitoring system whereby the troubleshooting procedure of the system hardware is substantially reduced.

In accordance with the present invention, there is provided a system and method for monitoring pneumatic pressures to facilitate chemical mechanical polishing (CMP). The pressure monitoring system, arranged in a close loop circuit, includes an air regulator, a pressure transducer, a pressure difference transducer and a pressure difference regulator. In one embodiment, the hardware is equipped to facilitate findings of three control parameters of the monitoring system—polishing air pressure ($P_p$), pressure difference of the polishing air pressure and a corresponding wafer air pressure ($D_p$), and deviation of the output pressure difference from a set point pressure difference ($C_p$).

By monitoring $P_p$, $D_p$ and $C_p$, air streams in a CMP process can be effectively regulated on a real time basis and the troubleshooting procedure for the system hardware can be practically reduced.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
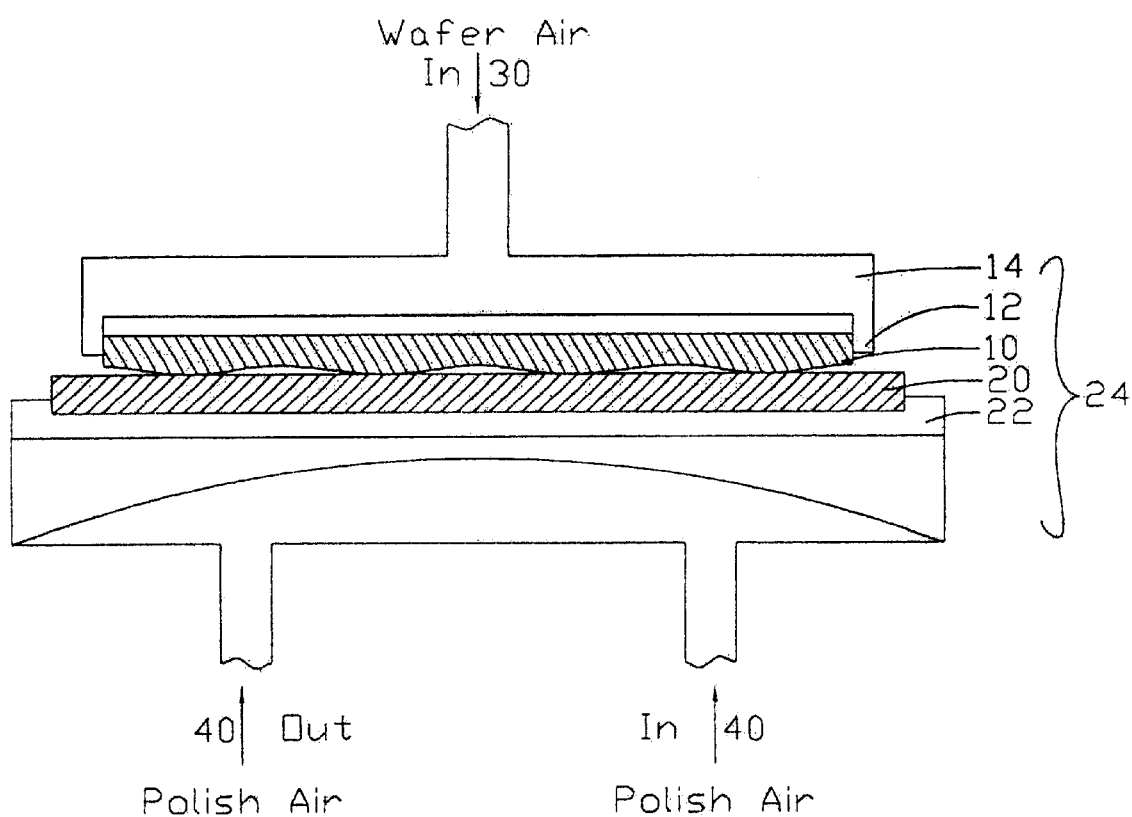
FIG. 1A is a schematic showing a typical setup diagram for chemical-mechanical polishing (CMP) process.
Figure 1B:
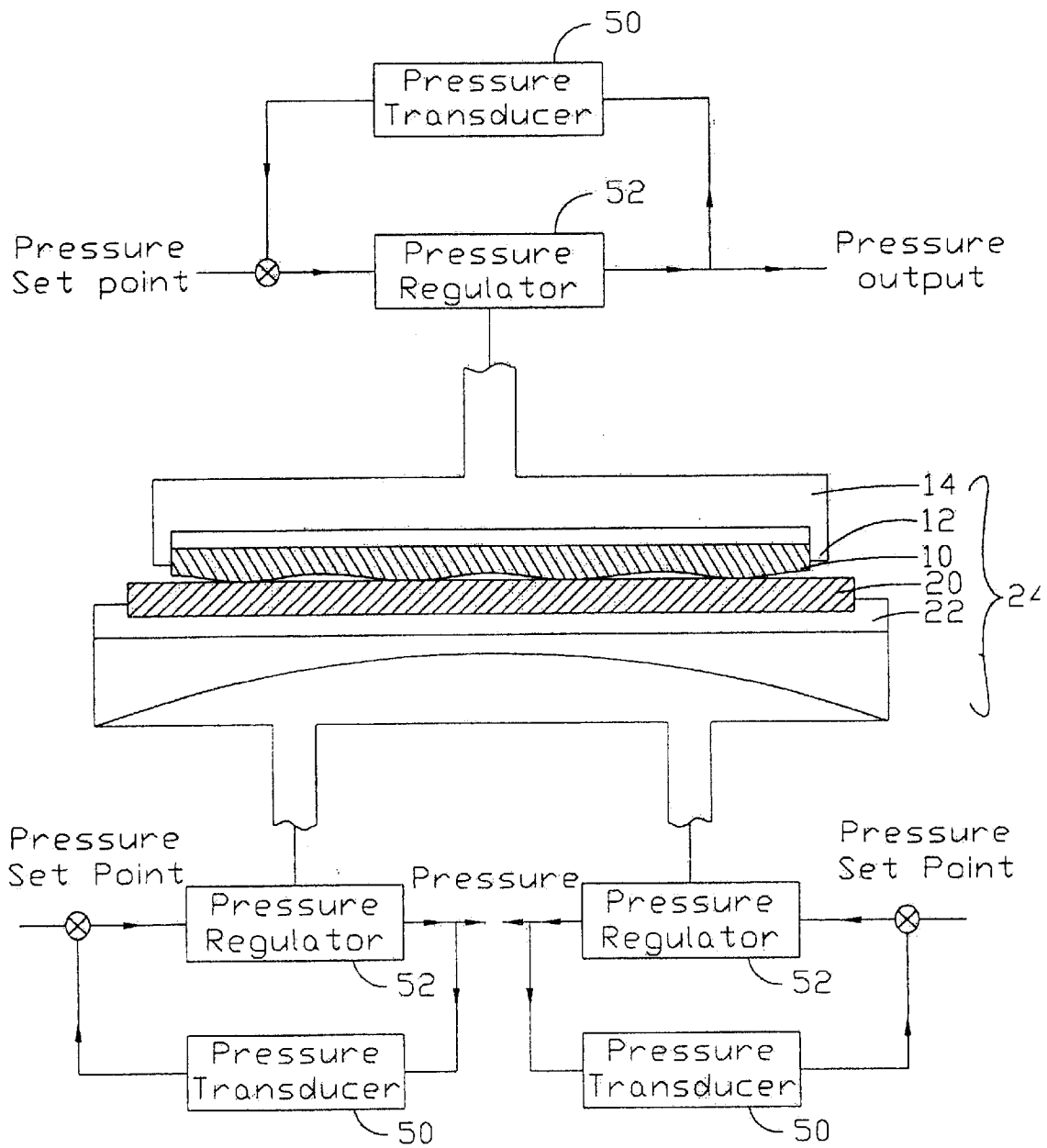
FIG. 1B shows features of the invention specified in the prior art. Pressure transducer 50 and pressure regulator 52 are connected respectively on the wafer air 30 and on the polish air 40.
Figure 2A:
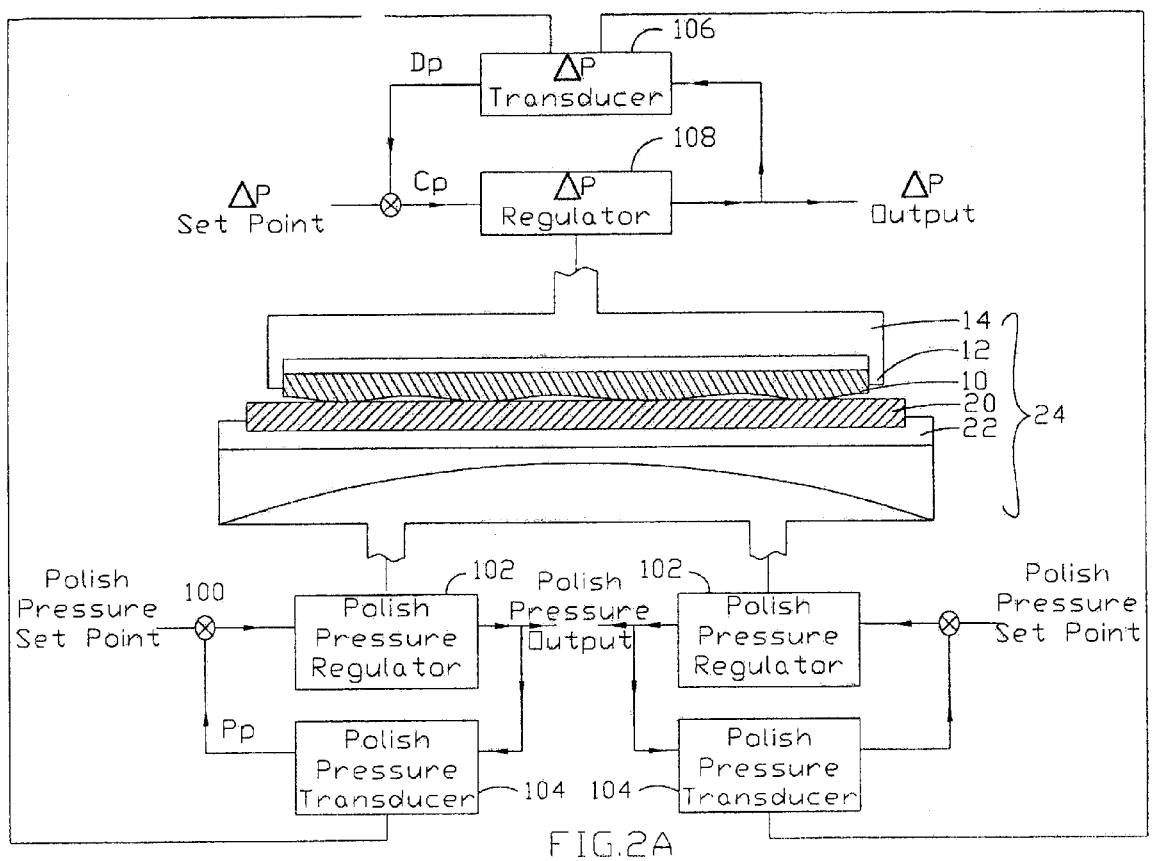
FIG. 2A is a schematic illustration of a pressure monitoring circuit in accordance with the present invention.
Figure 2B:
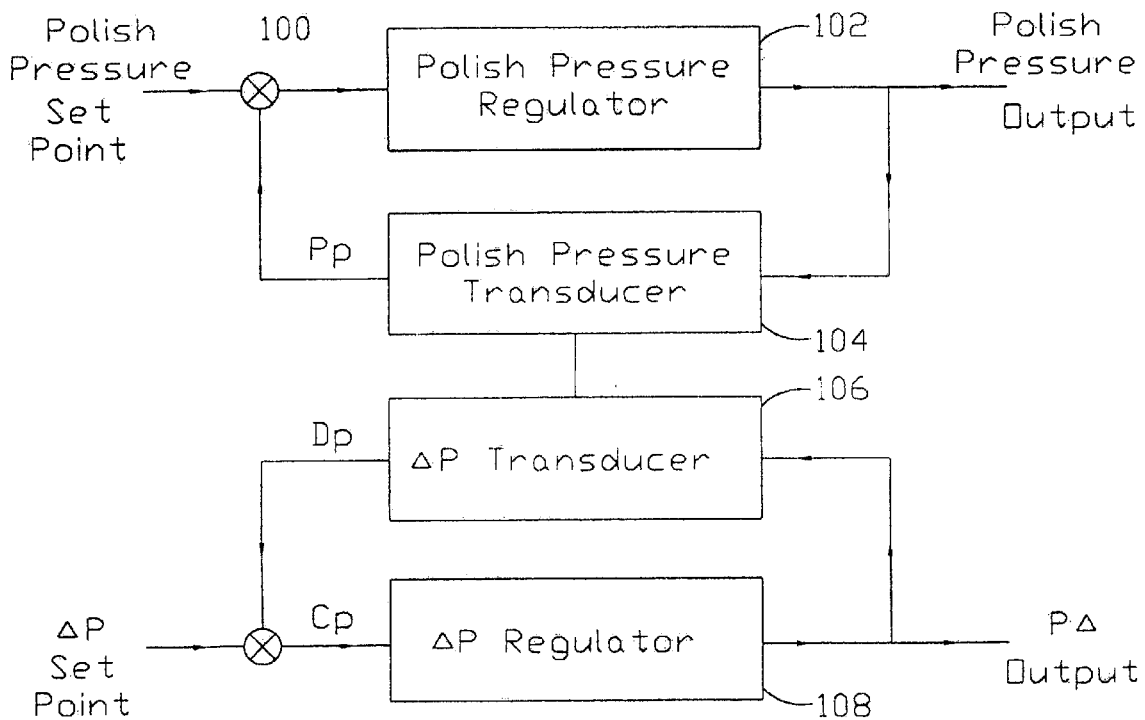
FIG. 2B shows features of the invention specified in the Claims. ΔP transducer 106 and ΔP regulator 108 are arranged in a closed loop circuit on the wafer air. Polish pressure regulator 102 and polish pressure transducer 104 are arranged in a closed loop circuit on the polish air. Then, the closed loop circuit on the wafer air is connected to the closed loop circuit on the polish air respectively.

Referring to FIG. 2A, a pressure monitoring circuit 100, intended to facilitate chemical mechanical polishing (CMP), according to one embodiment of this invention is illustrated. Circuit 100 includes the following hardware: an air regulator 102, a pressure transducer 104, a pressure difference transducer 106 and a pressure difference regulator 108. The hardware is equipped to facilitate findings of three control parameters of the monitoring system—polishing air pressure ($P_p$), pressure difference of the polishing air pressure and a corresponding wafer air pressure ($D_p$), and deviation of the output pressure difference from a set point pressure difference ($C_p$).

During the polishing operation, there are typically several air streams flowing into CMP passages to supply air forces against backsides of the CMP pad and wafer substrate. Air regulator 102 is preferably equipped on the polish side to control air pressure value against the backside of the polishing pad. However, air regulator 102 can be used in the wafer side as well. For purposes of illustration, air regulator 102 hereof serves as a polish air regulator.

Transducer 104 is incorporated with air regulator 102 to generate a digital signal proportional to the pressure of the air at the outlet port of regulator 102 and return the output pressure value back to the inlet port of regulator 102. The digital readout establishes the first control paragraph, $P_p$, of the present monitoring system. The pressure feedback signals, i.e. the $P_p$ values, from transducer 104 are then monitored to appropriate activate and adjust regulator 102 so that the operating pressure remains at a desired level.

Besides the transducer (transducer 104) on the pad side, conventional monitoring system generally incorporates another regulator and transducer on the wafer side. Therefore, the pressures of the two air streams are individually adjusted from two similar sets (one set on the wafer side and one set on the polish side) of control system (one transducer and one regulator). In our embodiment, the pressure monitoring of the two air pressures is conversely related by replacing the conventional wafer pressure regulator and wafer air transducer with a pressure difference regulator 108 and a pressure difference transducer 106 respectively. Regulator 108 is connected to the air streams on both polish and wafer sides to adjust pressure difference of the two air streams. Transducer 106 is paired off with regulator 108 to generate digital signals representing the output values of the regulated pressure difference and return the output pressure difference values back to an inlet port of regulator 108. The signaled pressure difference is our second control parameter $D_p$. A good control of $D_p$ would enable the polishing surfaces in an appropriate contact.

However, there are instances that either pressure transducer (104 or 106) does not function properly and gives false readings. Under such circumstances, the monitoring of the $P_p$ and $D_p$ would be insufficient to provide appropriate polishing control. In order to compensate for such problem, a deviation parameter $C_p$ is therefore added in our design to secure pressure difference in an appropriate range. To obtain that, before signal feedback of transducer 106, output values of the pressure difference are compared to a predetermined value set for the desired pressure difference between the monitored air streams. The deviation of the output value from the desired set point becomes our third parameter $C_p$ and is constantly monitored to achieve effective process control. If any hardware problem occurred, an overshoot (or undershoot) phenomenon of the pressure difference adjustment would be immediately responded to offset the abnormal signal. Such response from regulator 108 would be indicated in the $C_p$ monitoring. This is especially useful when the hardware problem is resulted from transducer failure. The $C_p$ monitoring could make up the insufficiency of $P_p$ and $D_p$ monitoring in terms of problem detection of the kind. Upon receiving such overrun reading, immediate repair action may then be taken to avoid possible false operation.

The utilization of the pressure difference monitoring unites the monitoring system in one close loop circuit and thus improves the pneumatic pressure control in the real time basis. Required adjustment of the wafer air regulator can now be readily made on receiving an out-of-range signal transferred from the $D_p$ detection and the $C_p$ monitoring further secures the polishing contact. By utilizing the pressure difference application, the wafer air pressure now fluctuates with the polish air pressure to maintain the polishing in an appropriate contact. Such characteristic is especially crucial in the cases that the system air pressure being off the desired operation range. In such cases, the inherent response delay of two separate monitoring circuits in the prior art system would have a great possibility to cause false operation during polishing (the wafer could fall off the polish head if both air pressure were out of the operation range, and especially if the wafer air was larger than the polish air pressure). By uniting the monitoring circuits, our design effectively shortens the response delay and greatly prevents possible false operations of the kind.

Another advantage of the three control parameters in the present invention is to provide an effective troubleshooting procedure of the monitoring system, that is, practical problem detection of the circuit hardware. By monitoring the three control parameters, system problems can be easily detected in an early stage as soon as regulation overshoot (or undershoot) is observed. Regulation overshooting (or undershooting) is generally accompanying with certain hardware failures. Taking a typical polish air pressure of 4.5 psi and a pressure difference set point of 0.15 psi for example, a desired pressure of about 4.35 psi is expected at the wafer side. Regulator 102 maintains the polish pressure to a level of about 4.5 psi and transducer 104 shows the pressure output. The overrun of $P_p$ (for example, less than 4.3 or greater 4.7 psi, see FIG. 3A) thus indicates system problems at the polish (pad) side. One should check the applicability of regulator 102 and transducer 104 or supply line of the corresponding air stream. As for the $D_p$, any overshoot (for example, greater than 0.2 psi, see FIG. 3B) would cause improper polish contact and the CMP system has to be immediately shutdown to prevent possible wafer or other mechanical damage. Unstable $P_p$ conditions and wafer head leakage are the usual causes for $D_p$ overrun. Troubleshooting would then be focused on these areas. Further, the abrupt fluctuation of $C_p$ indicates a strong offset requirement of regulator 108 and implies other hardware problems. Usually, a higher overshoot (for example, greater than 0.1 psi) indicates wafer head leakage and a lower overshoot (for example, 4.4 to 4.6 psi) shows control problems (transducer problem if $P_p$ and $D_p$ are normal, regulator failure otherwise) of the monitoring system. With the application of the three control parameters, the troubleshooting procedure in many cases become much more simplified. Instead of checking over for all the system hardware, one can quickly determine the possible faulty parts and focus only on certain problem areas. The troubleshooting time is thus effectively reduced.

Figure 3A:
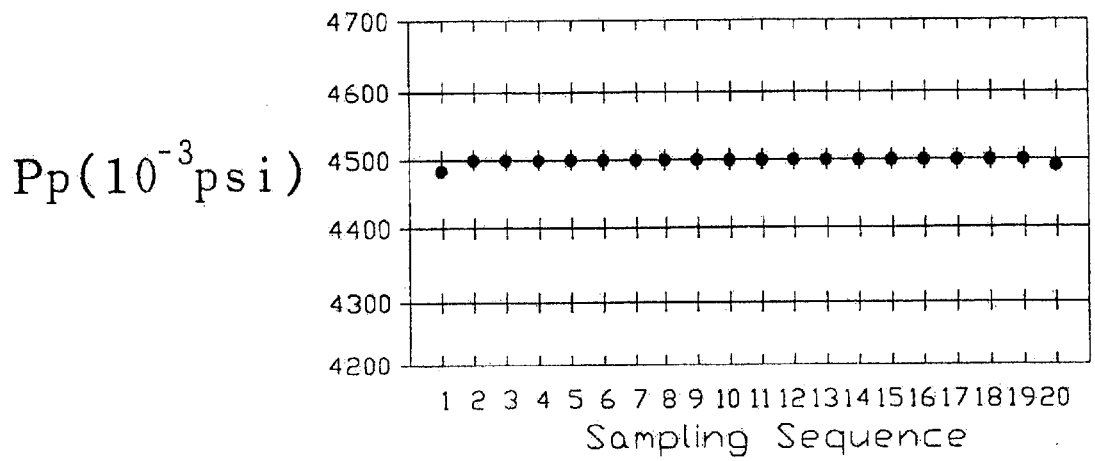
FIGS. 3A, 3B and 3C are SPC (Statistical Process Control) read-outs according to the present invention respectively showing polish air pressure ($P_p$), pressure difference ($D_p$) and pressure difference deviation ($C_p$) measurements during a typical CMP process.
Figure 3B:
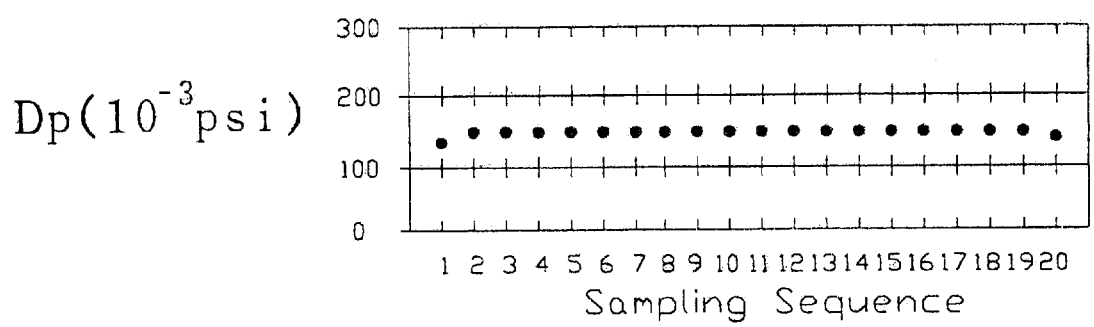
Figure 3C:
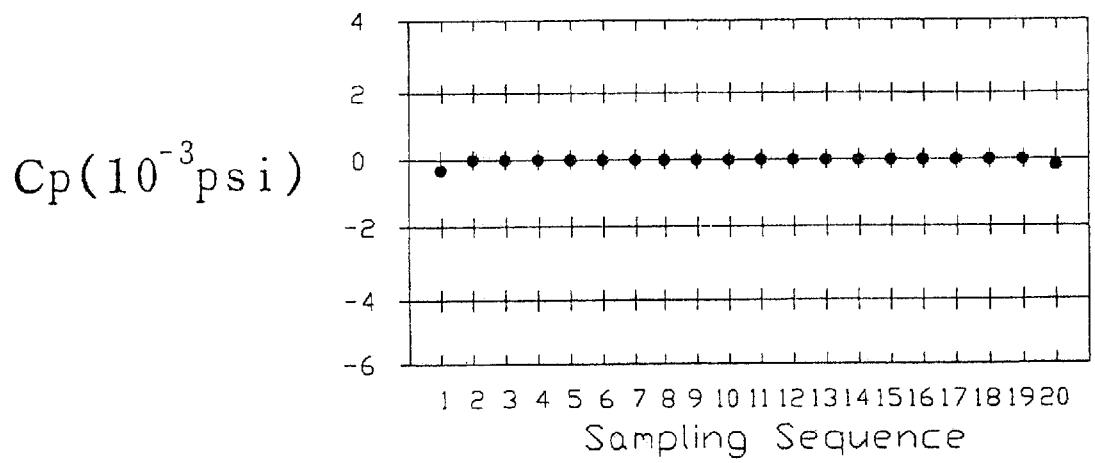

To facilitate monitoring of these control parameters ($P_p$, $D_p$ and $C_p$), a statistical process control (STC) system can be adapted to initiate warnings and activate alarms. FIGS. 3A, 3B and 3C show SPC (Statistical Process Control) read-outs respectively showing polish air pressure ($P_p$), pressure difference ($D_p$) and pressure difference deviation ($C_p$) measurements during a typical CMP process.

Although specific embodiments have been illustrated and described, it will be obvious to those skilled in the art that various modifications may be made without departing from what is intended to be limited solely by the appended claims.

What is claimed is:

1. A pressure monitoring system, comprising:
    means for regulating one of two air pressures;
    means for transferring an output pressure value obtained from an outlet port of said pressure regulating means into a pressure digital signal and returning said output pressure value back to an inlet port of said pressure regulating means;
    means for regulating pressure difference of said two air pressures; and
    means for transferring an output pressure difference value obtained from an outlet port of said pressure difference regulating means into a pressure difference digital signal and returning said output pressure difference value and a deviation of said output pressure difference value from a predetermined set point value back to an inlet port of said pressure difference regulating means.

2. The system according to claim 1 is arranged in a closed loop circuit.

3. The system according to claim 1 is adapted in a chemical-mechanical polishing (CMP) setup.

4. The system according to claim 3, wherein said two air pressures comprise one air pressure directed to a polish head and one air pressure applied to a base portion of said CMP setup.

5. The system according to claim 1, further comprising means for initiating a warning in response to said pressure digital signal being out of a predetermined reference range.

6. The system according to claim 1, further comprising means for activating an alarm in response to the value of said pressure digital signal being out of a predetermined operation range.

7. The system according to claim 1, further comprising means for initiating a warning in response to pressure difference digital signal being out of a predetermined reference range.

8. The system according to claim 1, further comprising means for activating an alarm in response to pressure difference digital signal being out of a predetermined operation range.

9. The system according to claim 1, further comprising means for initiating a warning in response to said deviation being out of a predetermined reference range.

10. The system according to claim 1, further comprising means for activating an alarm in response to said deviation being out of a predetermined operation range.

11. The system according to claim 1, further comprising means for statistical process control of said pressure digital signal, said pressure difference digital signal and said deviation.

12. A pneumatic pressure monitoring system for chemical-mechanical polishing (CMP), comprising:
    an air regulator equipped on one of two pneumatic conveyor lines to adjust air pressure of the corresponding pneumatic conveyor line in a desired range;
    a pressure transducer incorporated with said air regulator for transferring an output pressure signal back to an inlet port of said air regulator;
    a difference regulator connected to said two pneumatic conveyor lines for regulating pressure difference between said two pneumatic conveyor lines;
    a difference transducer incorporated with said difference regulator for transferring an output pressure difference signal back to an inlet port of said difference regulator; and
    a statistical process control (SPC) system for monitoring said output pressure signal, said pressure difference signal and a deviation of said pressure difference signal from a predetermined reference value.

13. The system according to claim 12 is arranged in a closed loop circuit.

14. The system according to claim 12, wherein said predetermined reference value is a set point for desired pressure difference between said two pneumatic conveyor lines during said chemical-mechanical polishing.

15. A method of monitoring a pneumatic pressure system for chemical-mechanical polishing, comprising:
    monitoring a first pressure applied to backside of a polishing pad;
    monitoring pressure difference of said first pressure from a second pressure, wherein said second pressure is applied to backside of a wafer substrate being polished by said polishing pad; and
    monitoring deviation of said pressure difference from a predetermined reference value.

16. The method according to claim 15, wherein said predetermined reference value is a value for desired pressure difference of said first pressure and said second pressure during said chemical-mechanical polishing.

* * * * *